June 18, 1963  A. R. DAVIDSON  3,094,238
ACCESS DOORS

Filed Feb. 27, 1961

2 Sheets-Sheet 1

Inventor
Alastair R. Davidson
by Sommers & Young
Attorneys

June 18, 1963

A. R. DAVIDSON 3,094,238

ACCESS DOORS

Filed Feb. 27, 1961

2 Sheets-Sheet 2

Inventor
Alastair R. Davidson
by Sommers & Young
Attorneys

United States Patent Office 3,094,238
Patented June 18, 1963

3,094,238
ACCESS DOORS
Alastair Ritchie Davidson, Sanderstead, England, assignor to A. B. Plastics Limited, Orpington, England
Filed Feb. 27, 1961, Ser. No. 92,053
Claims priority, application Great Britain Mar. 11, 1960
7 Claims. (Cl. 220—25)

This invention relates to access doors, sometimes called access plates, intended particularly, though not exclusively, for round-section tubes made of synthetic plastics.

According to the invention, an access door comprises two similarly-shaped elongated plate members constructed for fitting inside and outside an elongated aperture whose dimensions are slightly smaller than those of the two plate members, and a screw-threaded member rigidly mounted in the inner plate member and projecting therefrom into the outer plate member, in which latter said screw-threaded member is captive. The use of a captive screw-threaded member keeps the two plate members together and prevents the inner one from being dropped within the tube or other enclosure in which the access door is fitted.

The screw-threaded member may be a bolt which projects through the outer plate member and out on the far side from the inner plate member, and which has a captive nut on its end for drawing or clamping the two plate members together and for keeping the bolt captive within the outer plate member.

Alternatively, the screw-threaded member may be of hollow cylindrical form, with means for retaining it in a countersunk bore in the outer plate member and formed with an internal screw thread for engaging a clamping bolt or screw inserted from outside the outer plate member. The retaining means may be a circlip mounted in a circumferential groove in the outer wall of the hollow cylindrical member, or it may be a conical formation which can be forced or sprung into the outer plate member but cannot be withdrawn therefrom. The head of the clamping bolt or screw may seat against one or more upstanding sealing ribs on, or in a countersunk portion of, the outer plate member.

The access aperture and the two plate members are of elongated shape, preferably with straight sides and semi-circular ends.

Figure 1:
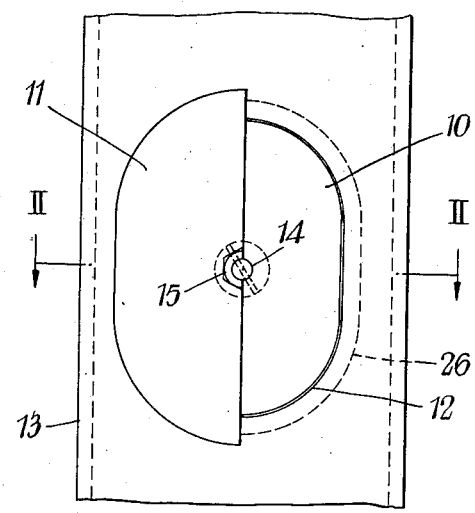
Figure 2:
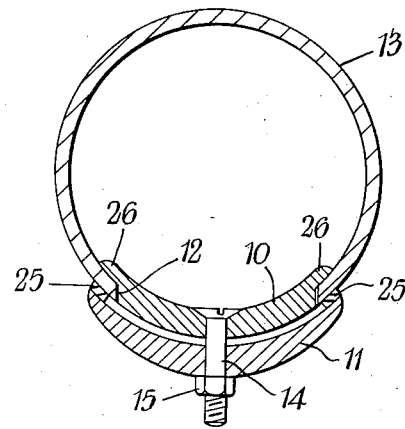
Figure 3:
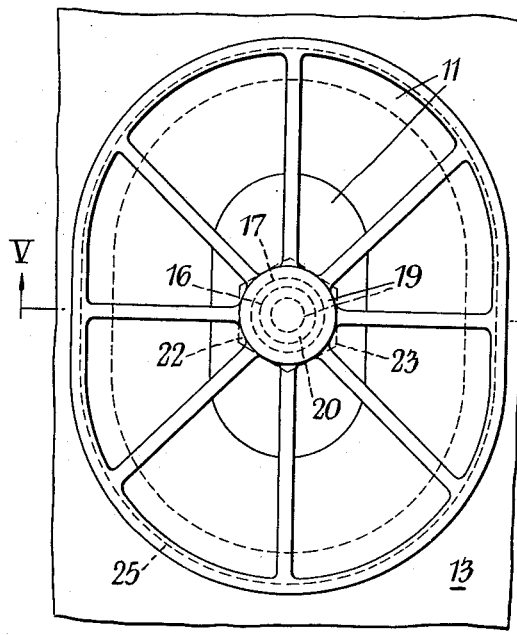
Figure 4:
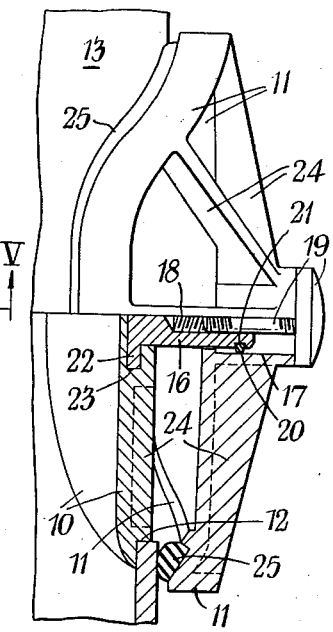
Figure 6:
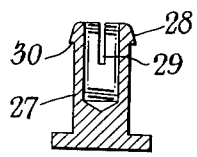
Figure 5:
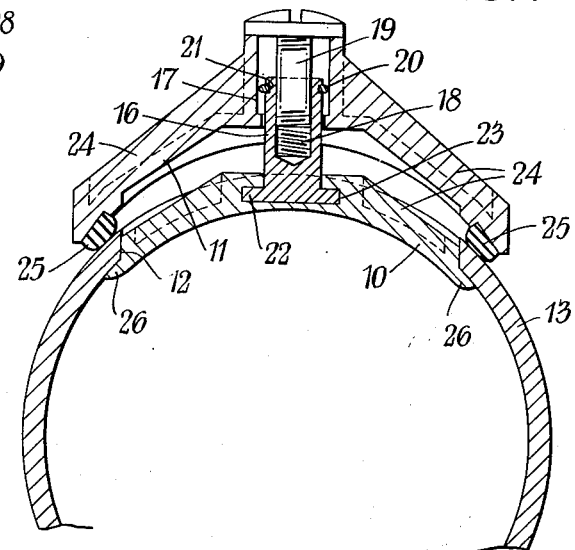

In order to enable the invention to be readily understood, reference is directed by way of example to the accompanying drawings wherein:

FIGURE 1 is a plan of part of a tube having one construction of the access door applied thereto, FIGURE 2 a section of the tube and access door on the line II—II of FIGURE 1, FIGURE 3 a view similar to FIGURE 1 showing another construction of the access door, FIGURE 4 a part central section and part elevation of FIGURE 3, FIGURE 5 a sectional view on the line V—V of FIGURE 3, and FIGURE 6 a sectional view of a modified screw-threaded member.

In FIGURES 1 and 2, the access door, embodying the two similarly shaped inner and outer elongated plate members 10 and 11 respectively, is shown applied to an elongated aperture 12 in the tube 13. The plate members and the aperture are shown by half-plan in FIGURE 1 merely for illustrative purposes, the plate members being shown fully, in cross-section, in FIGURE 2. The screw-threaded member is a bolt 14 which is rigidly mounted in the inner plate member 10 and projects through the outer plate member 11 and out on the far side thereof from the inner plate member 10. This bolt has a captive nut 15 on its tail end for use in drawing or clamping the two plate members together and for keeping the bolt captive within the outer plate member 11. The nut may be made captive by, for example, upsetting the thread at the tail extremity of the bolt.

In FIGURES 3 to 5, the screw-threaded member 16 is of hollow cylindrical form with means for retaining it in a countersunk bore 17 in the outer plate member 11 and formed with an internal screw thread 18 for engaging a clamping screw 19 inserted from outside the outer plate member. As shown the said retaining means may be a circlip 20 mounted in a circumferential groove 21 in the outer wall of the hollow cylindrical member. The latter has a hexagonal flange 22 at its inner end to fit in a corresponding recess 23 in the inner plate member 10 so as to be rigidly mounted in such member.

In both constructions above described, the access aperture 12 and the two plate members 10 and 11 are of elongated shape, and as shown preferably have straight sides and semi-circular ends in plan. Both plate members suitably may be ribbed, as at 24, for strength.

Further, to prevent leakage through the access door, a rubber or similar sealing strip 25 is preferably provided around the periphery of the outer plate member 11. The inner plate member 10 may be formed with a projecting flange 26 around its periphery, while the main portion, from which the flange projects, is of substantially the same dimensions as the access aperture 12. This main portion then fits snugly within the aperture while the flange seats against the inner wall of the tube 13 or other enclosure, cf. FIGURES 2 and 5. The flange 26 may be provided with a sealing gasket (not shown) if desired.

It will be apparent, that owing to the screw-threaded member 14 or 16 being captive as stated, there is no possibility of the plate members 10 and 11 becoming detached from each other whether on or removed from, the tube (or other enclosure that may be used). Installation of the access door may be effected with the bolt 14 or screw 19 loosened sufficiently to enable the inner plate member 10 to be swung angularly and entered through the elongated aperture 12 and then swung back to be let at its main part into such aperture. Some angular adjustment of the outer plate member 11 may also be desirable and when both plate members are brought into alignment with the aperture, the bolt 14 or screw 19 is tightened up to complete the operation. Removal of the access door can be effected by the reverse operations on the plate members after loosening the bolt 14 or screw 19.

The access door which has been described is particularly intended for use with round-section synthetic plastic tubes, in which case the two plate members are also made of synthetic plastic and, as the drawings indicate, are curved transversely on the same radius as the tube. The access door may, however, be applied to other types of enclosure as above indicated. When of synthetic plastic, the inner plate member of FIGURES 3 to 5 may be moulded round the screw-threaded member 16, and its flange 22, which would preferably be of metal. However, if such plate member be of other material, the recess 23 would be suitably formed to allow of insertion of the screw-threaded member 16 and its retention by the flange as will be understood.

The invention is not restricted to the constructions above particularly described and illustrated, because modifications are possible without departing from the scope of the appended claims. For instance, instead of using a hollow internally screw-threaded member retained in the outer plate member 11 by a circlip as in FIGURES 3 to 5, the construction illustrated in FIGURE 6 may be employed. In that construction, the hollow internally screw-threaded member 27, mostly similar to the one 16, has a conical formation 28 and is slit as at 29, so that such member can be forced or sprung into a countersunk bore such as 17 aforesaid in the outer plate member but cannot be withdrawn therefrom, being held captive by the under edge 30 of the conical formation. As another modification, the nut 15, FIGURES 1 and 2, or the head of the screw 19, FIGURES 3 to 5, may seat against one or more upstanding annular sealing ribs (not shown) formed on the external surface of the outer plate member 11 or on the bottom of a similar circular recess therein for the nut or screw head, these ribs being concentric with the axis of the bolt 14 or screw 19; or other suitable sealing device may be used at such seating.

I claim:

1. An access door comprising, in combination, first and second elongated plates of generally similar form with margins for overlapping the entire periphery of each side of a corresponding elongated aperture, the first plate being for one side of the aperture and the second plate being for the other side of the aperture, at least one of the plates being capable, without distortion or complete separation of the plates, of being passed edgewise through the aperture, a screwthreaded member mounted rigidly in the first plate and projecting therefrom through a bore in the second plate, retaining means associated with the screw threaded member and holding the latter captive in the bore, a complementary screwthreaded member upon the first-mentioned screwthreaded member enabling the plates to be drawn together for closing the aperture, the said margin of the first plate being of form corresponding to the margin of the aperture so as to be in sealing relationship therewith, and a peripheral seal on the said margin of the second plate.

2. An access door as claimed in claim 1, wherein the first plate has a spigot with a surrounding flange, the spigot corresponds to the aperture, the flange by the surface thereof adjacent the spigot provides the said margin of the first plate, and the reverse side of the first plate, namely the side thereof remote from the spigot, has a peripheral bevel merging with the said margin adjacent the spigot to form a flush-fitting closure surrounding the aperture when the plates close the latter.

3. An access door as claimed in claim 1, wherein the first plate has a spigot with a surrounding flange, the periphery of the spigot is substantially equal to that of the aperture, and the flange by the surface thereof adjacent the spigot provides the said margin of the first plate.

4. An access door as claimed in claim 3, wherein the reverse side of the first plate, namely the side thereof remote from the spigot, has a peripheral bevel merging with the said margin adjacent the spigot to form a flush-fitting closure surrounding the aperture when the plates close the latter.

5. An access door as claimed in claim 1, wherein the first-mentioned screwthreaded member is as a nut, one end whereof is enveloped by the first plate, the retaining means is on the outer end of the nut whereby the said outer end is held captive in a countersunk bore through the second plate, and a clamping bolt is inserted in the bore from the outside of the second plate and is in engagement with the nut.

6. An access door as claimed in claim 5, wherein the retaining means is a circlip mounted in a circumferential groove in the outer wall of the nut.

7. An access door as claimed in claim 1, wherein the first-mentioned screwthreaded member is as a nut, one end whereof is enveloped by the first plate, and the retaining means consists of a longitudinally-divided outer end portion of the nut for imparting lateral resilience to the outer extremity of the end portion, the latter being of a conical formation extending laterally at its base beyond the sides of the end portion to form peripheral abutment surfaces for engagement with the second plate.

References Cited in the file of this patent

UNITED STATES PATENTS

| | | |
|---|---|---|
| 1,349,510 | Jochumsen | Aug. 10, 1920 |
| 1,500,423 | Sherry | July 8, 1924 |
| 2,167,597 | Webb | July 25, 1939 |
| 2,557,356 | Little | June 19, 1951 |